US009097299B2

(12) United States Patent
Sharp

(10) Patent No.: US 9,097,299 B2
(45) Date of Patent: Aug. 4, 2015

(54) ELECTROMAGNETIC ACTUATOR FOR A BI-DIRECTIONAL CLUTCH

(71) Applicant: Warner Electric Technology LLC, Braintree, MA (US)

(72) Inventor: Jeffry D. Sharp, Brighton, MI (US)

(73) Assignee: Warner Electric Technology LLC, Braintree, MA (US)

( * ) Notice: Subject to any disclaimer, the term of this patent is extended or adjusted under 35 U.S.C. 154(b) by 0 days.

(21) Appl. No.: 14/192,327

(22) Filed: Feb. 27, 2014

(65) Prior Publication Data

US 2014/0291100 A1    Oct. 2, 2014

Related U.S. Application Data

(60) Provisional application No. 61/807,541, filed on Apr. 2, 2013.

(51) Int. Cl.
| | |
|---|---|
| *F16D 41/16* | (2006.01) |
| *F16D 41/12* | (2006.01) |
| *F16D 27/10* | (2006.01) |
| *F16D 27/00* | (2006.01) |

(52) U.S. Cl.
CPC ............. *F16D 41/16* (2013.01); *F16D 41/12* (2013.01); *F16D 27/004* (2013.01); *F16D 27/10* (2013.01)

(58) Field of Classification Search
CPC ....... F16D 41/16; F16D 41/12; F16D 27/004; F16D 27/10
USPC ...................... 192/43.1, 45.1, 84.31, 46, 84.8
See application file for complete search history.

(56) References Cited

U.S. PATENT DOCUMENTS

| | | | | |
|---|---|---|---|---|
| 1,960,004 | A | * | 5/1934 | Franz .............................. 192/47 |
| 2,409,009 | A | * | 10/1946 | Bakke ............................. 192/46 |
| 3,164,234 | A | * | 1/1965 | Tamarin .......................... 192/40 |
| 3,463,279 | A | | 8/1969 | Breisch et al. |
| 5,996,758 | A | | 12/1999 | Baxter, Jr. |
| 8,042,670 | B2 | * | 10/2011 | Bartos et al. ................. 192/43.1 |
| 2010/0252384 | A1 | | 10/2010 | Eisengruber |
| 2011/0011694 | A1 | | 1/2011 | Swales et al. |
| 2013/0248313 | A1 | | 9/2013 | Rubino |

OTHER PUBLICATIONS

International Search Report issued in corresponding international application PCT/US2014/032024 (Feb. 10, 2015).
Written Opinion issued in corresponding international application PCT/US2014/032024 (Feb. 10, 2015).

* cited by examiner

*Primary Examiner* — Robert Hodge
*Assistant Examiner* — Ryan Dodd
(74) *Attorney, Agent, or Firm* — Reising Ethington P.C.

(57) ABSTRACT

A bi-directional clutch is provided having inner and outer members disposed about a rotational axis. One or more pawls are coupled to one of the members and configured for rotation about separate rotational axes. One end of each pawl moves between first and second engagement positions with corresponding engagement surfaces formed in the other member and a position of disengagement with the other member permitting relative rotation of the inner and outer members. A pair of magnets are disposed at the opposite end of each pawl with each magnet in the pair defining a pole adjacent the end of the pawl and the poles having opposite polarity. An electromagnetic actuator selectively generates electromagnetic fields of different polarities to urge the pawls away from the position of disengagement to one of the engagement positions to cause rotation of the other member in either rotational direction.

16 Claims, 3 Drawing Sheets

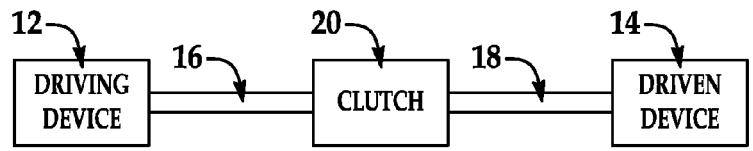
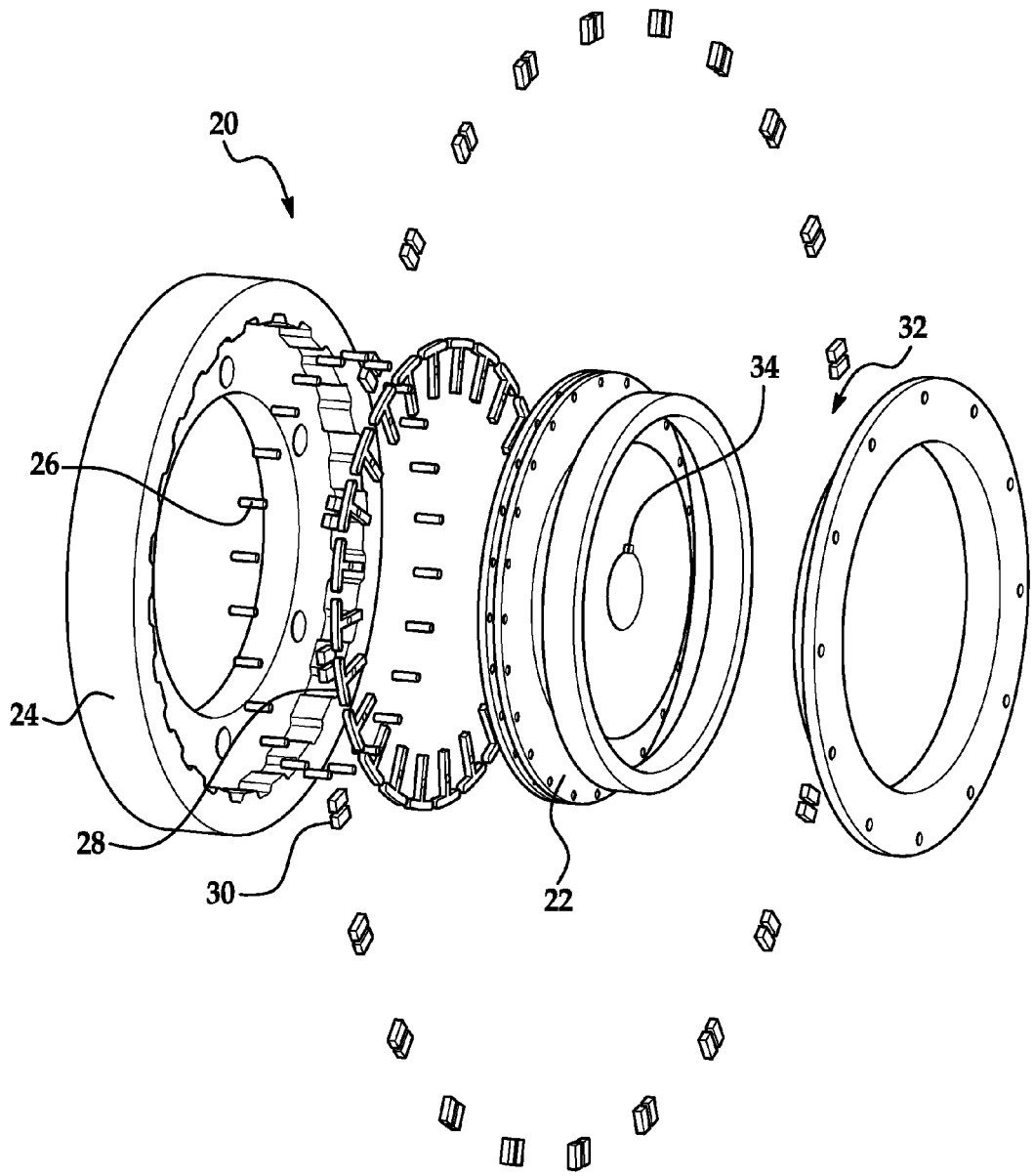
FIG. 1
FIG. 2

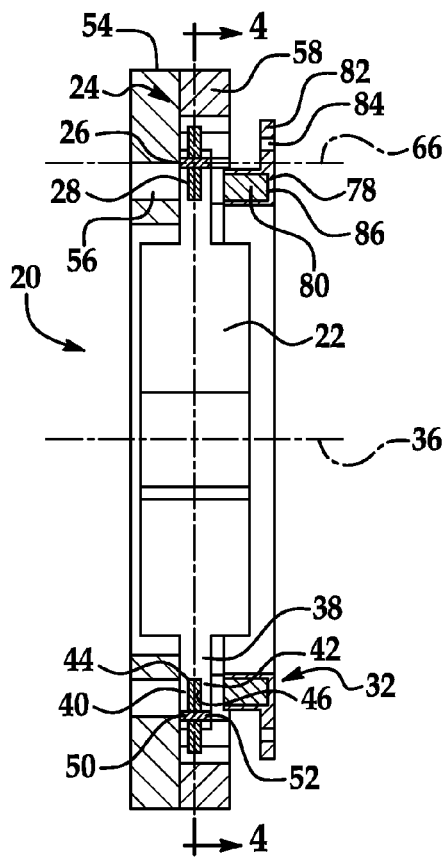
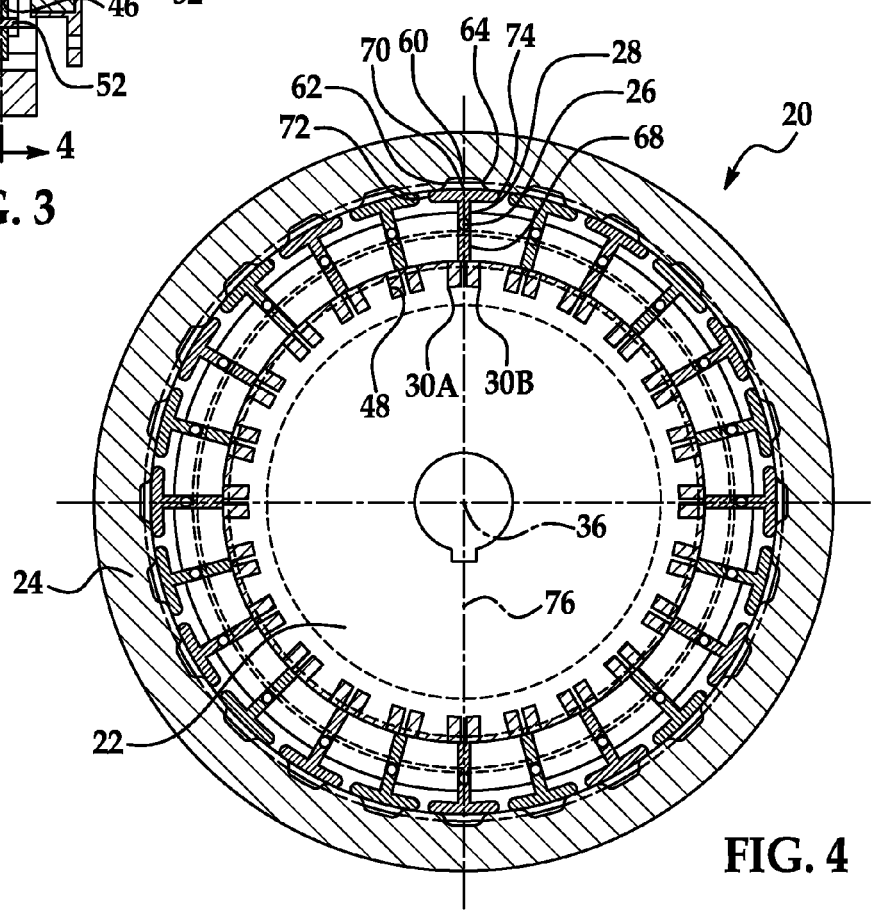
FIG. 3
FIG. 4

ELECTROMAGNETIC ACTUATOR FOR A BI-DIRECTIONAL CLUTCH

BACKGROUND OF THE INVENTION a. Field of the Invention

This invention relates to a bi-directional clutch. In particular, the instant invention relates to a clutch having a structure that enables engagement of the clutch with relatively few parts and with less physical contact between the parts than in conventional clutches.

b. Background Art

Clutches are used in many applications to selectively engage and disengage a driving device such as a motor with a driven device (e.g. a conveyor or a reel for a hose or cable) in order to transfer torque from the driving device to the driven device. Clutch engagement and/or disengagement may occur through, mechanical, fluid or electro-magnetic actuation or even manually by the user. One conventional type of clutch that relies on mechanical actuation is a ratchet and pawl clutch. In this type of clutch, pawls are brought into engagement with grooves formed in the surface of one of the clutch members often by spring loading or by centrifugal force. In U.S. Publication No. 2013-0248313, an improved pawl clutch is disclosed in which an actuator or drag link includes a plurality of tangs that engage pawls in the clutch upon relative rotation of the clutch members in order to move the pawls into an engaged position and transmit torque between the clutch members. The disclosed clutch represents a significant improvement over conventional clutches. Contact between the actuator and the pawls, however, may result in generation of heat and debris from wear at the point of engagement between the actuator and pawls.

The inventor herein has recognized a need for a bi-directional clutch that will minimize and/or eliminate one or more of the above-identified deficiencies.

BRIEF SUMMARY OF THE INVENTION

An improved bi-directional clutch is provided. In particular, a bi-directional clutch is provided that enables engagement of the clutch with relatively few parts and with less physical contact between the parts than in conventional clutches.

A bi-directional clutch in accordance with one embodiment of the present invention includes an inner member disposed about a first rotational axis and an outer member disposed about the first rotational axis radially outward of the inner member. The clutch further includes a pawl coupled to one of the inner and outer members. The pawl has first and second ends and is configured for rotation about a second rotational axis such that the first end of the pawl moves between a first engagement position with a first pawl engagement surface in another of the inner and outer members, a second engagement position with a second pawl engagement surface in the another member, and a position of disengagement with the another member permitting relative rotation of the inner and outer members. The clutch further includes a pair of magnets disposed at the second end of the pawl. Each magnet of the pair of magnets defines a pole adjacent the second end of the pawl. The poles of the pair of magnets have opposite polarity. The clutch further includes an electromagnetic actuator configured to selectively generate a first electromagnetic field having a first polarity and a second electromagnetic field having a second polarity opposite the first polarity. The first electromagnetic field urges the pawl away from the position of disengagement to the first engagement position to cause rotation of the another member in a first rotational direction and the second electromagnetic field urges the pawl away from the position of disengagement to the second engagement position to cause rotation of the another member in a second rotational direction opposite the first rotational direction.

A bi-directional clutch in accordance with another embodiment of the present invention includes an inner member disposed about a first rotational axis and an outer member disposed about the first rotational axis radially outward of the inner member. The clutch further includes a first pawl coupled to one of the inner and outer members. The first pawl has first and second ends and is configured for rotation about a second rotational axis such that the first end of the first pawl moves between a first engagement position with a first pawl engagement surface in another of the inner and outer members, a second engagement position with a second pawl engagement surface in the another member, and a position of disengagement with the another member permitting relative rotation of the inner and outer members. The clutch further includes a first pair of magnets disposed at the second end of the first pawl. Each magnet of the first pair of magnets defines a pole adjacent the second end of the first pawl. The poles of the first pair of magnets have opposite polarity. The clutch further includes a second pawl coupled to the one member. The second pawl has first and second ends and is configured for rotation about a third rotational axis such that the first end of the second pawl moves between a first engagement position with a third pawl engagement surface in the another member, a second engagement position with a fourth pawl engagement surface in the another member, and a position of disengagement with the another member permitting relative rotation of the inner and outer members. The clutch further includes a second pair of magnets disposed at the second end of the second pawl. Each magnet of the second pair of magnets defines a pole adjacent the second end of the second pawl The poles of the second pair of magnets have opposite polarity. The clutch further includes an electromagnetic actuator configured to selectively generate a first electromagnetic field having a first polarity and a second electromagnetic field having a second polarity opposite the first polarity. The first electromagnetic field urges the first and second pawls away from the positions of disengagement to the first engagement positions to cause rotation of the another member in a first rotational direction and the second electromagnetic field urges the first and second pawls away from the positions of disengagement to the second engagement positions to cause rotation of the another member in a second rotational direction opposite the first rotational direction.

A bi-directional clutch in accordance with the present invention is advantageous relative to conventional clutches because it has relatively few parts and is therefore less complex and less costly than conventional clutches. The clutch is also advantageous because controlled movement of the pawls in the clutch is accomplished without physically contacting the pawls thereby reducing generation of heat in the clutch and debris from wear on contacting parts.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 1 is a diagrammatic view of a system incorporating a clutch in accordance with the present teachings.

FIG. 2 is an exploded view of a clutch in accordance with the present teachings.

FIG. 3 is a cross-sectional view of the clutch of FIG. 2.

FIG. 4 is a cross-sectional view of the clutch of FIGS. 2-3 taken along lines 4-4 in FIG. 3 and illustrating disengagement of the clutch.

DETAILED DESCRIPTION OF EMBODIMENTS OF THE INVENTION

Figure 5:
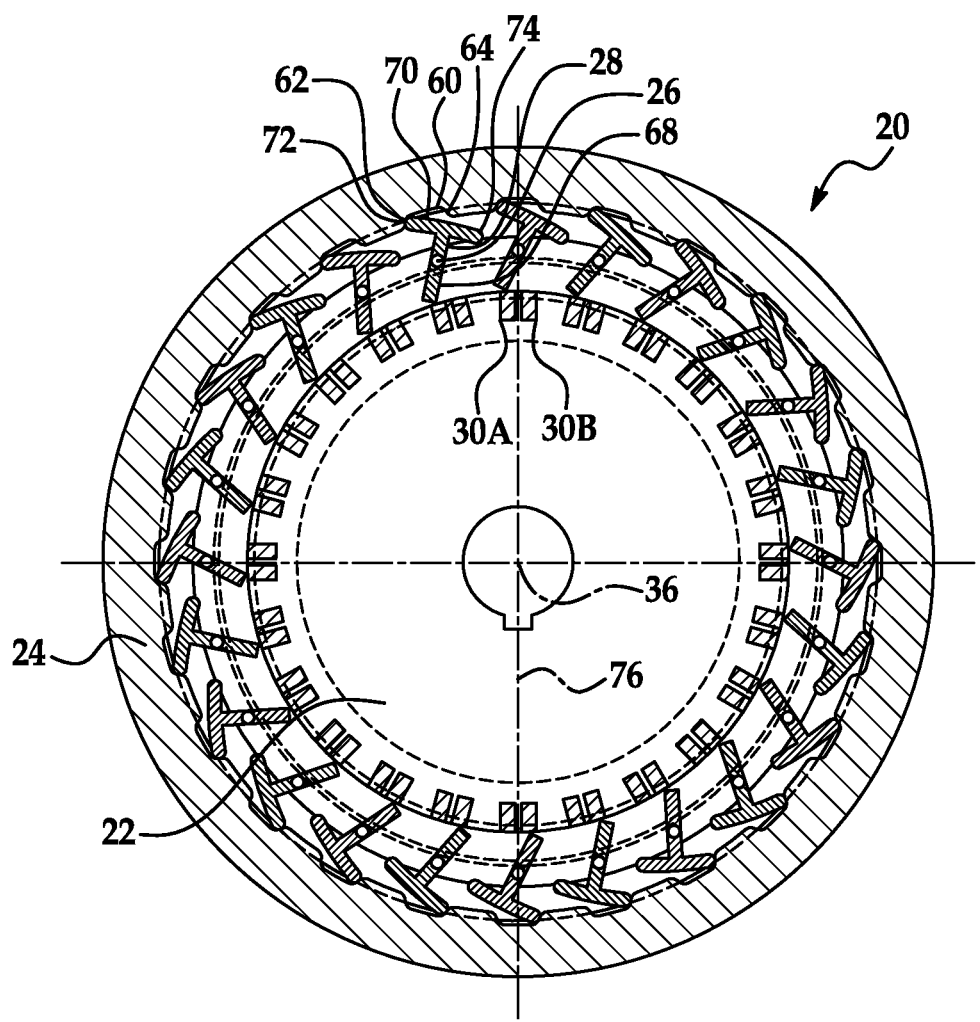
FIG. 5 is a cross-sectional views of the clutch of FIGS. 2-4 illustrating engagement of the clutch.

Referring now to the drawings wherein like reference numerals are used to identify identical components in the various views, FIG. 1 illustrates a power generation and transmission system 10. System 10 includes a driving device 12 for generating power used to drive a driven device 14. The driving device 12 may comprise a conventional motor including, for example, an electric motor, hydraulic motor or pneumatic motor. Device 12 may further include a conventional gear box or speed reducer (which may be combined with the motor to form a conventional gear motor) to control the output speed and torque delivered to driven device 14. Device 12 may output rotational torque through an output member 16 such as a shaft or another rotating body such as a gear, pulley or sprocket. Driven device 14 may comprise, for example, a conveyor or a reel on which is mounted a hose, an electric cable or a steel cable. It should be understood, that the form of device 14 will depend on the application and that device 14 may comprise any of a wide variety of devices configured to receive an input torque. Device 14 may input rotational torque through an input member 18 such as a shaft or another rotating body such as a gear, pulley or sprocket. System 10 may further include a clutch 20 in accordance with the present invention. Clutch 20 selectively couples devices 12, 14 to provide torque output by device 12 to device 14. In particular, clutch 20 receives torque from output member 16 of device 12 and selectively transfers torque to input member 18 of device 14. It should be understood that output member 16 may be formed in device 12 or clutch 20 and, similarly, that input member 18 may be formed in device 14 or clutch 20.

Referring now to FIGS. 2-4, one embodiment of a clutch 20 in accordance with the present invention is illustrated. Clutch 20 comprises a bi-directional clutch and, in particular, a bi-directional overrunning clutch. An overrunning clutch is a type of mechanical clutch that is designed to drive in one direction while freewheeling or overrunning in the opposition direction. In the driving direction, the clutch also freewheels if the rotational speed of the driven device exceeds the rotational speed of the driving device. Bi-directional overrunning clutches are capable of driving and overrunning in both directions. One of the benefits of an overrunning clutch is that it allows for the overrunning of large inertia loads upon stopping and prevents any back-driving damage that may occur to the driving device 12. Clutch 20 may include an inner member 22, an outer member 24, mounting pins 26, pawls 28, magnets 30 and an electromagnetic actuator 32.

Inner member 22 is configured to receive an input torque from output member 16 of driving device 12 which may be selectively transferred to outer member 24 of clutch 20 as described in greater detail hereinbelow. Member 22 is annular in construction and may be configured to receive a shaft (not shown) extending from or to device 12 (e.g., the shaft may comprise input member 16 or may be coupled to input member 16). Referring to FIG. 2, member 22 may define a keyway 34 or key configured to engage a matching key or keyway, respectively, in the shaft in order to couple member 22 to the shaft for rotation about a rotational axis 36 (FIG. 3). Referring to FIG. 3, the diameter of the radially outer surface of member 22 may vary. At either axial end, the diameter of member 22 may be sized to be received within member 24 and to support actuator 32, respectively. Intermediate the axial ends of member 22, member 22 may form a pawl housing or mounting structure 38. Housing 38 may include a pair of radially outwardly extending, axially spaced flanges 40, 42. Flanges 40, 42, together with an axially extending wall 44 formed in housing 38, form a circumferential recess 46 configured to receive pawls 28. Referring to FIG. 4, housing 38 may define a plurality of radially extending recesses 48 in wall 44 configured to receive magnets 30. Referring again to FIG. 3, each flange 40, 42 may define a plurality of axially extending apertures 50, 52, respectively, spaced equally circumferentially about flanges 40, 42. Each aperture 50 may be axially aligned with a corresponding aperture 52. Apertures 50, 52 are configured to receive opposite longitudinal ends of mounting pins 26 extending through recess 44 and corresponding pawls 28.

Outer member 24 is configured to transfer torque to driven device 14. Member 24 is annular in construction and disposed about axis 36 radially outwardly of inner member 22. The inner diameter of member 24 varies along its axial length. In particular, member 24 may define a reduced diameter portion 54 at one axial or longitudinal end of member 24 configured to be received on an axial end portion of inner member 22. A thin film of lubricant may be disposed between portion 54 of member 24 and member 22. Alternatively, a bearing (e.g., a sleeve bearing or roller bearing) may be disposed between members 22, 24. Portion 54 may define a plurality of axially extending, circumferentially based bores 56 configured to receive pins or other fasteners (not shown) through which member 24 may be coupled to input member 18. It will be understood, however, that member 24 may be coupled to input member 18 in a variety of ways. Member 24 may define an increased diameter portion 58 at another axial or longitudinal end of member 24 that is sized to receive pawl housing 38 of member 22. Referring to FIGS. 4-5, portion 58 of member 24 defines a plurality of recesses 60 formed in a radially inner surface of portion 58. Recesses 60 may be equally spaced circumferentially about member 58 and the number of recesses 60 may correspond to the number of pawls 28 (e.g., the number of recesses 60 may be equal to the number of pawls 28). Each recess 60 defines a pair of pawl engagement surfaces 62, 64. In the illustrated embodiment, recess 60 is generally trapezoidal in shape with surfaces 62, 64 forming an obtuse angle with the radial bottom of the recess 60 such that recess 60 narrows or tapers moving radially outwardly. It should be understood, however, that the shape and orientation of recess 60 and surfaces 62, 64 is complementary to the shape and orientation of pawls 28 and therefore may vary depending on the shape and orientation of pawls 28.

Mounting pins 26 provide a means for mounting pawls 28 to member 22 and particularly to pawl housing 38 of member 22. Referring to FIG. 3, the longitudinal ends of pins 26 are configured to be received within recesses 50, 52 in flanges 40, 42 of housing 38 and pins 26 are further configured to extend through corresponding bores formed in pawl 28. Each pin 26 defines an axis 66 and a pivot point for a corresponding pawl 28 about axis 66 as discussed in greater detail below.

Pawls 28 are provided to engage pawl engagement surfaces 62, 64 in outer member 24 in order to transfer torque from inner member 22 to outer member 24. Each pawl 28 is supported on a mounting pin 26 and pivots about the rotational axis 66 extending through pin 26. Referring to FIGS. 4-5, each pawl 28 is shown T-shaped in cross-section and includes a radially extending stem 68 and a circumferentially extending arm 70 coupled to one end of stem 68. In the illustrated embodiment, arm 70 is coupled to the radially outer end of stem 68 and forms a radially outward end of pawl 28. It should be understood, however, that clutch 20 could alternatively be configured to transfer torque from output member 24 to input member 22 with pawl engagement surfaces formed on a radially outer surface of member 22, pawls 28 and magnets 30 supported on member 24 and arm 70 of pawl 28 coupled to a radially inner end of stem 68 and forming a radially inward end of pawl 28. Stem 68 is configured to be received within recess 44 in pawl housing 38. Stem 68 defines an axially extending bore intermediate the radially inner and outer ends of stem 68 configured to receive mounting pin 26. Arm 70 is coupled to stem 68 intermediate the circumferential ends of arm 70. Arm 70 defines clutch engagement surfaces 72, 74 at opposite circumferential ends of arm 70. Clutch engagement surfaces 72, 74 are configured to engage pawl engagement surfaces 62, 64, respectively, in recesses 60 to provide bi-directional clutch engagement. It should be understood that the shape and orientation of surfaces 72, 74 is intended to be complementary to the shape and orientation of surfaces 72, 74 and may therefore vary.

Magnets 30 are provided to urge pawls 28 to a position of disengagement permitting relative rotation of members 22, 24. Magnets 30 are disposed in recesses 48 in inner member 22. Magnets 30 may be arranged in pairs at a radially inner end of pawl 28 and, particularly, stem 68 of pawl 28. Referring to FIG. 4, the two magnets 30A, 30B in each pair may be disposed in whole or in part on either side of a plane 76 extending through axis 36 and the axis 66 about which the pawl 28 rotates and may be equidistant from the plane. Each magnet 30A, 30B in the pair defines a pole adjacent the radially inner end of pawl 28. The poles of the two magnets in each pair have opposite polarity and establish a magnetic circuit with stem 68 that, in the absence of an external force, maintains stem 68 in a position extending generally parallel to plane 76 and, therefore, maintains arm 70 of pawl 28 in a position of disengagement from member 24.

Actuator 32 is provided to establish electromagnetic fields in order to modify the magnetic circuit among pawl 28 and magnets 30A, 30B and urge pawls 28 into engagement with member 24. In the embodiment illustrated in FIG. 3, actuator 32 includes a housing 78 and a coil 80. It should be understood, however, that actuator 32 could be formed in a variety of ways provided that actuator 32 is capable of generating the electromagnetic fields required to modify the magnetic circuit among pawl 28 and magnets 30A, 30B.

Housing 78 may be annular in shape and may be centered about axis 36. Housing 78 may define a radially outwardly extending flange 82 at one axial or longitudinal end of housing 78 having a plurality of axially extending, circumferentially spaced bores 84 configured to receive fasteners (not shown) for mounting actuator 32 to a stationary. Housing 78 may further define a circumferential recess 86 in an opposite axial or longitudinal end of housing 78 configured to receive coil 80.

Coil 80 may comprise a wound coil and may be disposed within recess 86 of housing 78. Coil 80 may be connected to an external current source (not shown) via a standard terminal connector (not shown). Coil 80 may be connected to an alternating current or direct current voltage that can be selectively applied as positive or negative to generate the desired magnetic field. The voltage may be controlled using a conventional on/off switch. Current may be routed through coil 80 in opposite directions to create electromagnetic fields having different polarities. These electromagnetic fields are used to modify the magnetic circuit among pawl 28 and magnets 30A, 30B to urge pawl 28 into one or more positions of engagement with member 24 to drive member 24 in either rotational direction. Routing current through coil 80 in one direction establishes a positive voltage and an electromagnetic field having a positive polarity. Referring to FIG. 5, the positive polarity field will cancel out the field from one magnet 30B in each magnet pair while strengthening the field from the other magnet 30A in each magnet pair. The resulting magnetic circuit will draw the radially inward end of the stem 68 of a pawl 28 towards the magnet 30A with the strengthened field causing pawl 28 to rotate about axis 66 and causing clutch engagement surface 72 to engage pawl engagement surface 62 in member 24 to drive member 24 in one rotational direction. Routing current through coil 80 in the opposite direction establishes a negative voltage and an electromagnetic field having a negative polarity. The negative polarity field will cancel out the field from one magnet 30A in each magnet pair while strengthening the field from the other magnet 30B in each magnet pair. The resulting magnetic circuit will draw the radially inward end of the stem 68 of a pawl 28 towards the magnet 30B with the strengthened field causing pawl 28 to rotate about axis 66 and causing clutch engagement surface 74 to engage pawl engagement surface 64 in member 24 to drive member 24 in the opposite rotational direction.

A bi-directional clutch 20 in accordance with the present invention is advantageous relative to conventional clutches because it has relatively few parts and is therefore less complex and less costly than conventional clutches. The clutch 20 is also advantageous because controlled movement of the pawls 28 in the clutch 20 is accomplished without physically contacting the pawls 28 thereby reducing generation of heat in the clutch 20 and debris from wear on contacting parts.

While the invention has been shown and described with reference to one or more particular embodiments thereof, it will be understood by those of skill in the art that various changes and modifications can be made without departing from the spirit and scope of the invention.

I claim:

1. A bi-directional clutch, comprising:
an inner member disposed about a first rotational axis;
an outer member disposed about said first rotational axis radially outward of said inner member;
a first pawl coupled to one of said inner and outer members, said first pawl having first and second ends and configured for rotation about a second rotational axis such that said first end of said first pawl moves between a first engagement position with a first pawl engagement surface in another of said inner and outer members, a second engagement position with a second pawl engagement surface in said another member, and a position of disengagement with said another member permitting relative rotation of said inner and outer members;
a first pair of magnets disposed at said second end of said first pawl, each magnet of said first pair of magnets defining a pole adjacent said second end of said first pawl, said poles of said first pair of magnets having opposite polarity; and,
an electromagnetic actuator configured to selectively generate a first electromagnetic field having a first polarity and a second electromagnetic field having a second polarity opposite said first polarity wherein said first electromagnetic field urges said first pawl away from said position of disengagement to said first engagement position to cause rotation of said another member in a first rotational direction and said second electromagnetic field urges said first pawl away from said position of disengagement to said second engagement position to cause rotation of said another member in a second rotational direction opposite said first rotational direction.

2. The bi-directional clutch of claim 1 wherein said inner member is coupled to a driving device and said outer member is coupled to a driven device.

3. The bi-directional clutch of claim 1 wherein said outer member is coupled to a driving device and said inner member is coupled to a driven device.

4. The bi-directional clutch of claim 1 further comprising a mounting pin extending from said one member and supporting said first pawl, said mounting pin defining a pivot point for said first pawl about said second rotational axis.

5. The bi-directional clutch of claim 1 wherein said first pawl includes:
   a radially extending stem; and
   a circumferentially extending arm coupled to said stem at said first end of said first pawl.

6. The bi-directional clutch of claim 5 further comprising a mounting pin extending from said one member through said stem intermediate radially inner and outer ends of said stem, said mounting pin defining a pivot point for said first pawl about said second rotational axis.

7. The bi-directional clutch of claim 5 wherein said arm defines first and second clutch engagement surfaces at opposite circumferential ends of said arm, said first clutch engagement surface configured for engagement with said first pawl engagement surface in said another member and said second clutch engagement surface configured for engagement said second pawl engagement surface in said another member.

8. The bi-directional clutch of claim 1 wherein said electromagnetic actuator is axially aligned with said first pair of magnets.

9. A bi-directional clutch, comprising:
   an inner member disposed about a first rotational axis;
   an outer member disposed about said first rotational axis radially outward of said inner member;
   a first pawl coupled to one of said inner and outer members, said first pawl having first and second ends and configured for rotation about a second rotational axis such that said first end of said first pawl moves between a first engagement position with a first pawl engagement surface in another of said inner and outer members, a second engagement position with a second pawl engagement surface in said another member, and a position of disengagement with said another member permitting relative rotation of said inner and outer members;
   a first pair of magnets disposed at said second end of said first pawl, each magnet of said first pair of magnets defining a pole adjacent said second end of said first pawl, said poles of said first pair of magnets having opposite polarity;
   a second pawl coupled to said one member, said second pawl having first and second ends and configured for rotation about a third rotational axis such that said first end of said second pawl moves between a first engagement position with a third pawl engagement surface in said another member, a second engagement position with a fourth pawl engagement surface in said another member, and a position of disengagement with said another member permitting relative rotation of said inner and outer members;
   a second pair of magnets disposed at said second end of said second pawl, each magnet of said second pair of magnets defining a pole adjacent said second end of said second pawl, said poles of said second pair of magnets having opposite polarity; and,
   an electromagnetic actuator configured to selectively generate a first electromagnetic field having a first polarity and a second electromagnetic field having a second polarity opposite said first polarity
   wherein said first electromagnetic field urges said first and second pawls away from said positions of disengagement to said first engagement positions to cause rotation of said another member in a first rotational direction and said second electromagnetic field urges said first and second pawls away from said positions of disengagement to said second engagement positions to cause rotation of said another member in a second rotational direction opposite said first rotational direction.

10. The bi-directional clutch of claim 9 wherein said inner member is coupled to a driving device and said outer member is coupled to a driven device.

11. The bi-directional clutch of claim 9 wherein said outer member is coupled to a driving device and said inner member is coupled to a driven device.

12. The bi-directional clutch of claim 9 further comprising first and second mounting pins extending from said one member and supporting corresponding ones of said first pawl and second pawls, said first and second mounting pins defining pivot points for said first pawl about said second rotational axis and said second pawl about said third rotational axis.

13. The bi-directional clutch of claim 9 wherein said first pawl includes:
   a radially extending stem; and
   a circumferentially extending arm coupled to said stem at said first end of said first pawl.

14. The bi-directional clutch of claim 13 further comprising a mounting pin extending from said one member through said stem intermediate radially inner and outer ends of said stem, said mounting pin defining a pivot point for said first pawl about said second rotational axis.

15. The bi-directional clutch of claim 13 wherein said arm defines first and second clutch engagement surfaces at opposite circumferential ends of said arm, said first clutch engagement surface configured for engagement with said first pawl engagement surface in said another member and said second clutch engagement surface configured for engagement said second pawl engagement surface in said another member.

16. The bi-directional clutch of claim 9 wherein said electromagnetic actuator is axially aligned with said first and second pairs of magnets.

* * * * *

UNITED STATES PATENT AND TRADEMARK OFFICE
CERTIFICATE OF CORRECTION

| | |
|---|---|
| PATENT NO. | : 9,097,299 B2 |
| APPLICATION NO. | : 14/192327 |
| DATED | : August 4, 2015 |
| INVENTOR(S) | : Jeffry D. Sharp |

Page 1 of 1

It is certified that error appears in the above-identified patent and that said Letters Patent is hereby corrected as shown below:

In the Claims

In column 7, line 38 (claim 7), "clutch engagement surface configured for engagement said" should read "clutch engagement surface configured for engagement with said".

In column 8, line 37 (claim 12), "second pawls" should read "said second pawl".

In column 8, line 55 (claim 15), "clutch engagement surface configured for engagement said" should read "clutch engagement surface configured for engagement with said".

Signed and Sealed this
Twenty-ninth Day of December, 2015

Michelle K. Lee
*Director of the United States Patent and Trademark Office*